United States Patent
Falcone et al.

(10) Patent No.: US 9,267,626 B2
(45) Date of Patent: Feb. 23, 2016

(54) THREADED SINK FLANGE ASSEMBLY FOR INSTALLATION OF A FOOD WASTE DISPOSER TO A SINK

(71) Applicant: Emerson Electric Co., St. Louis, MO (US)

(72) Inventors: Brian J. Falcone, Kenosha, WI (US); Jerry G. Ryder, Lake Bluff, IL (US); Walter Bennage, Pleasant Prairie, WI (US); Ping Yuan, Nanjing (CN)

(73) Assignee: Emerson Electric Co., St. Louis, MO (US)

( * ) Notice: Subject to any disclaimer, the term of this patent is extended or adjusted under 35 U.S.C. 154(b) by 66 days.

(21) Appl. No.: 14/257,281

(22) Filed: Apr. 21, 2014

(65) Prior Publication Data

US 2014/0367963 A1    Dec. 18, 2014

Related U.S. Application Data

(60) Provisional application No. 61/835,761, filed on Jun. 17, 2013.

(51) Int. Cl.
*B02C 23/36*    (2006.01)
*F16L 15/00*    (2006.01)
*E03C 1/266*    (2006.01)

(52) U.S. Cl.
CPC ............. *F16L 15/006* (2013.01); *B02C 23/36* (2013.01); *E03C 1/2665* (2013.01)

(58) Field of Classification Search
CPC ...... F16L 15/006; E03C 1/2665; B02C 23/36
USPC ................................................... 241/46.015
See application file for complete search history.

(56) References Cited

U.S. PATENT DOCUMENTS

| 2,646,222 A | 7/1953 | Green |
| 2,782,997 A | 2/1957 | Wolff |

(Continued)

FOREIGN PATENT DOCUMENTS

| CN | 202570334 U | 12/2012 |
| EP | 78593 A1 | 5/1983 |

(Continued)

OTHER PUBLICATIONS

Innuovo Food Waste Disposer (Photos) Jan. 6, 2013.

(Continued)

*Primary Examiner* — Mark Rosenbaum
(74) *Attorney, Agent, or Firm* — Harness, Dickey & Pierce, P.L.C.

(57) ABSTRACT

A threaded sink flange assembly for a food waste disposer includes a threaded sink flange, a sink flange nut, an upper mounting flange and a retainer. The threaded sink flange has a tubular body portion that has an externally threaded portion and a plurality of radially outwardly projecting mounting ledges with gaps therebetween. The sink flange nut is internally threaded with threaded portions interspersed with gaps, there being at least a gap corresponding to each mounting ledge. The upper mounting flange is annular having a top ring with a plurality of radially inwardly extending mounting projections. The mounting projections are received on the mounting ledges when the upper mounting flange is assembled to the threaded sink flange. A plurality of flanges extend from a bottom of an outer wall of the upper mounting flange with each flange having a radially outwardly extending inclined mounting ramp.

9 Claims, 4 Drawing Sheets

(56) References Cited

U.S. PATENT DOCUMENTS

| | | | |
|---|---|---|---|
| 2,784,915 A | 3/1957 | Gordan | |
| 3,386,671 A | 6/1968 | Turner | |
| 3,982,703 A | 9/1976 | Meyers | |
| 4,310,933 A | 1/1982 | Stratman | |
| 4,405,159 A | 9/1983 | Spelber | |
| 4,562,602 A | 1/1986 | Cuschera | |
| 6,477,756 B2 | 11/2002 | Newcomer | |
| 8,220,731 B2 | 7/2012 | Berger et al. | |
| 2006/0202069 A1 | 9/2006 | Chavez | |
| 2008/0290012 A1 | 11/2008 | Shih | |
| 2008/0301871 A1 | 12/2008 | Hanson et al. | |
| 2012/0080546 A1 | 4/2012 | Bennage | |
| 2012/0256025 A1 | 10/2012 | Bennage | |

FOREIGN PATENT DOCUMENTS

| | | | |
|---|---|---|---|
| GB | 2162089 A | 1/1986 | |
| GB | 2212576 A | 7/1989 | |
| JP | H10266296 A | 10/1998 | |
| JP | H111409935 A | 5/1999 | |
| JP | H11157602 A | 6/1999 | |
| JP | 2003275612 A | 9/2003 | |
| JP | 2006054803 A | 2/2006 | |
| JP | 4876567 B2 | 2/2012 | |
| KR | 10-1126612 B1 | 3/2012 | |

OTHER PUBLICATIONS

Anaheim Manufacturing Waste King Food Waste Disposer Guide, Feb. 7, 2005.

Food waste disposers from Ningbo Eson Motor Co., Ltd. Website, on sale on or before Jan. 1, 1997.

European Search Report (in English) issued on Nov. 14, 2014 in corresponding European Application No. 14170420.

THREADED SINK FLANGE ASSEMBLY FOR INSTALLATION OF A FOOD WASTE DISPOSER TO A SINK

CROSS-REFERENCE TO RELATED APPLICATIONS

This application is claims the benefit of U.S. Provisional Application No. 61/835,761 filed on Jun. 17, 2013. The entire disclosure of the above application is incorporated herein by reference.

FIELD

The present disclosure relates generally to food waste disposers, and more particularly, to mount systems therefor.

Food waste disposers are used to comminute food scraps into particles small enough to safely pass through household drain plumbing. A conventional food waste disposer of the type for under sink mounting that is mounted to a sink, such as a kitchen sink, includes a food conveying section, a motor section, and a grinding section disposed between the food conveying section and the motor section. The food conveying section includes a housing that forms an inlet for receiving food waste and water. The food conveying section conveys the food waste to the grinding section, and the motor section includes a motor imparting rotational movement to a motor shaft to operate the grinding mechanism.

The grinding section in which comminution occurs typically has a rotating shredder plate with lugs and a stationary grind ring received in a housing of the grinding section. The motor turns the rotating shredder plate and the lugs force the food waste against the grind ring where it is broken down into small pieces. Once the particles are small enough to pass out of the grinding mechanism, they are flushed out into the household plumbing. Size control is primarily achieved through controlling the size of the gap through which the food particles must pass. In some cases, the housing of the grinding section and the housing of the food conveying section are integrally formed as a single housing. In other cases, they are not. Such a prior art food waste disposer is disclosed in U.S. U.S. Pat. No. 6,007,006, which is incorporated herein by reference in its entirety. The food waste disposer may be mounted in a well-known manner in the drain opening of a sink using mounting members of the type disclosed in U.S. Pat. No. 3,025,007, which is incorporated herein by reference in its entirety.

FIG. 1 depicts a prior art food waste disposer 100 which is similar to the prior art food waste disposer described in U.S. Pat. No. 7,360,729 and U.S. Pat. No. 7,360,729 is incorporated by reference herein in its entirety. The disposer includes an upper food conveying section 102, a central grinding section 104 and a motor section 106, which may include a variable speed motor. It should be understood that motor section 106 could also include a fixed speed motor, such as an induction motor. The grinding section 104 is disposed between the food conveying section 102 and the motor section 106.

The food conveying section 102 conveys the food waste to the grinding section 104. The food conveying section 102 includes an inlet housing 108 and a conveying housing 110. The inlet housing 108 has an inlet 109 at the upper end of the food waste disposer 100 for receiving food waste and water. Inlet 109 is surrounded by a gasket 111. The inlet housing 108 is attached to the conveying housing 110, such as by an antivibration mount 113.

The conveying housing 110 has an opening 142 to receive a dishwasher inlet 144. The dishwasher inlet is used to pass water from a dishwasher (not shown). The inlet housing 108 and conveying housing 110 may be made of metal or molded plastic. Alternatively, inlet housing 108 and conveying housing 110 may be one unitary piece.

The grinding section 104 includes a housing 112 surrounding a grinding mechanism 114 having a rotating shredder plate assembly 116 and a stationary grind ring 118. Housing 112 is formed as a clamp ring and clamps conveying housing 110 to an upper end bell 136 of motor section 106. Stationary grind ring 118, which includes a plurality of spaced teeth 120 (only two of which are indicated by reference number 120 in FIG. 1), may be received in an adaptor ring 122 disposed between housing 112 and stationary grind ring 118. A gasket 123 is disposed between adaptor ring 122 and an upper portion 125 of housing 112. A bottom flange 127 of conveying housing 110 is received in gasket 123 and gasket 123 seals conveying housing 110 to adaptor ring 122.

The rotating shredder plate assembly 116 may include a rotating shredder plate 124 mounted to a rotatable shaft 126 of a motor 128 of motor section 106, such as by a bolt 130. Motor 128 also includes a rotor 129 to which rotatable shaft 126 is affixed and a stator 131. A plurality of fixed lugs 132 (only one of which is shown in FIG. 1) are mounted on rotating shredder plate 124 as are a plurality of swivel lugs 134 (only one of which is shown in FIG. 1). It should be understood that in this regard, rotating shredder plate assembly 116 could include only fixed lugs 132 or only swivel lugs 134.

An upper end bell 136 is disposed beneath a bottom of rotating shredder plate 124. Upper end bell 136 includes a discharge chamber 140 having a discharge outlet 141 for coupling to a tailpipe or drainpipe (not shown).

In an aspect, food waste disposer 100 may include a trim shell 146 that surrounds food conveying section 102, grinding section 104 and motor section 106. A layer of sound insulation 148 may be disposed between trim shell 146 and conveying housing 110 of food conveying section 102 and housing 112 of grinding section 104.

In the operation of the food waste disposer 100, the food waste delivered by the food conveying section 102 to the grinding section 104 is forced by lugs 132, 134 of the rotating shredder plate assembly 116 against teeth 120 of the stationary grind ring 118. The sharp edges of the teeth 120 grind or comminute the food waste into particulate matter that combines with water, such as water that entered the food waste disposer through inlet 109, to form a slurry that drops into discharge chamber 140. This slurry is then discharged through the discharge outlet 141 into the tailpipe or drainpipe (not shown).

The food conveying section 102 (which includes inlet housing 108 and conveying housing 110) serves as the conduit for the food waste from the drain opening of the sink to the grinding mechanism of the grinding section. In a food waste disposer that operates in a batch feed mode, the amount of food waste that can be ground at a time is dictated by the volume of the food conveying section, mainly the conveying housing 110.

Food waste disposers such as food waste disposer 100 are often generally installed to a sink in a two-step procedure using a mounting assembly 200 of the type described in U.S. Pat. No. 3,025,007. First, a sink flange assembly 202, consisting of a sink flange 204, sink gasket 206, back-up flange 208, upper mounting flange 210, bolts 212, and retaining ring 214 are installed to the sink (not shown). Second, a disposer assembly consisting of a disposer such as disposer 100 (FIG. 1), a mounting gasket 216 (which is mounting gasket 111 in FIG. 1), and a lower mounting flange 218 are attached to the sink flange assembly. Lower mounting flange 218 is placed around inlet housing 108 of food conveying section 102 so that it is beneath inlet 109. Mounting gasket 216 is then placed around inlet 109. Inlet housing 108 of food conveying section 102 includes circumferential lip 188 extending around the circumference of inlet 109. Lip 188 is received in a corresponding recess (not shown) in mounting gasket 216 to secure mounting gasket 216 to food waste disposer at inlet 109. The attachment method, as described in U.S. Pat. No. 3,025,007, consists of engaging the mounting tabs 220 of the lower mounting flange 218 with the inclined mounting ramps 222 of the upper mounting flange 210 then rotating the lower mounting flange 218 until secure. The typical installation method involves raising the disposer 100 and mounting components to the sink flange assembly 202 with one hand then with the other hand lifting the lower mounting flange 218 and rotating to engage its mounting tabs 220 to the mounting ramps 222 of upper mounting flange 210. Rotating the lower mounting flange 218 brings it and upper mounting flange 210 securely together, compressing the mounting gasket 216 therebetween, and secures the disposer 100 to the sink flange assembly 202.

Sink flange assembly 202 of mounting assembly 200, while a proven and robust design, has several parts and multiple steps are needed to attach a food waste disposer to a sink using mounting assembly 200.

SUMMARY

This section provides a general summary of the disclosure and is not a comprehensive disclosure of its full scope or all of its features.

A threaded sink flange assembly for a food waste disposer in accordance with an aspect of the present disclosure includes a threaded sink flange, a sink flange nut, an upper mounting flange and a retainer. The threaded sink flange has a top flange portion that extends radially outwardly from a top of a tubular body portion. Tubular body portion has an externally threaded portion. Tubular body portion has a plurality of radially outwardly projecting mounting ledges adjacent and above a lower end of the tubular body portion with gaps therebetween. The sink flange nut is internally threaded around a central opening with threaded portions interspersed with gaps, there being at least a gap corresponding to each mounting ledge with those gaps being wider than the corresponding mounting ledges. The upper mounting flange has an annular shape with a top having a central opening defined by an inner periphery of a ring. A plurality of mounting projections extend radially inwardly from the inner periphery with gaps therebetween. The mounting projections are received on the mounting ledges when the upper mounting flange is assembled to the threaded sink flange. The upper mounting flange has an outer wall that extends downwardly from an outer periphery of the top ring of the upper mounting flange. A plurality of flanges extend downwardly from a bottom of the outer wall of the upper mounting flange with gaps therebetween so that there is a gap between adjacent flanges. Each of these downwardly extending flanges has a radially outwardly extending inclined mounting ramp.

In an aspect, tabs project outwardly from the bottom of the outer wall of the upper mounting flange into gaps between the flanges so that there is a tab projecting into each gap.

In an aspect, each mounting ledge has a receiving pocket therein. In an aspect, each mounting ledge has opposed upwardly projecting ends with a generally flat bottom therebetween that define the receiving pocket.

In an aspect, the retainer is a snap ring that is received around the tubular body portion of the threaded sink flange between a bottom of the threaded portion of the tubular body portion and the upper mounting flange when the upper mounting flange is assembled to the threaded sink flange.

In an aspect, the upper mounting flange has three mounting ramps spaced circumferentially from each other equidistantly around the outer wall of the upper mounting flange.

BRIEF DESCRIPTION OF THE DRAWINGS

Other objects and advantages of the invention will become apparent upon reading the following detailed description and upon reference to the drawings in which.

Figure 1:
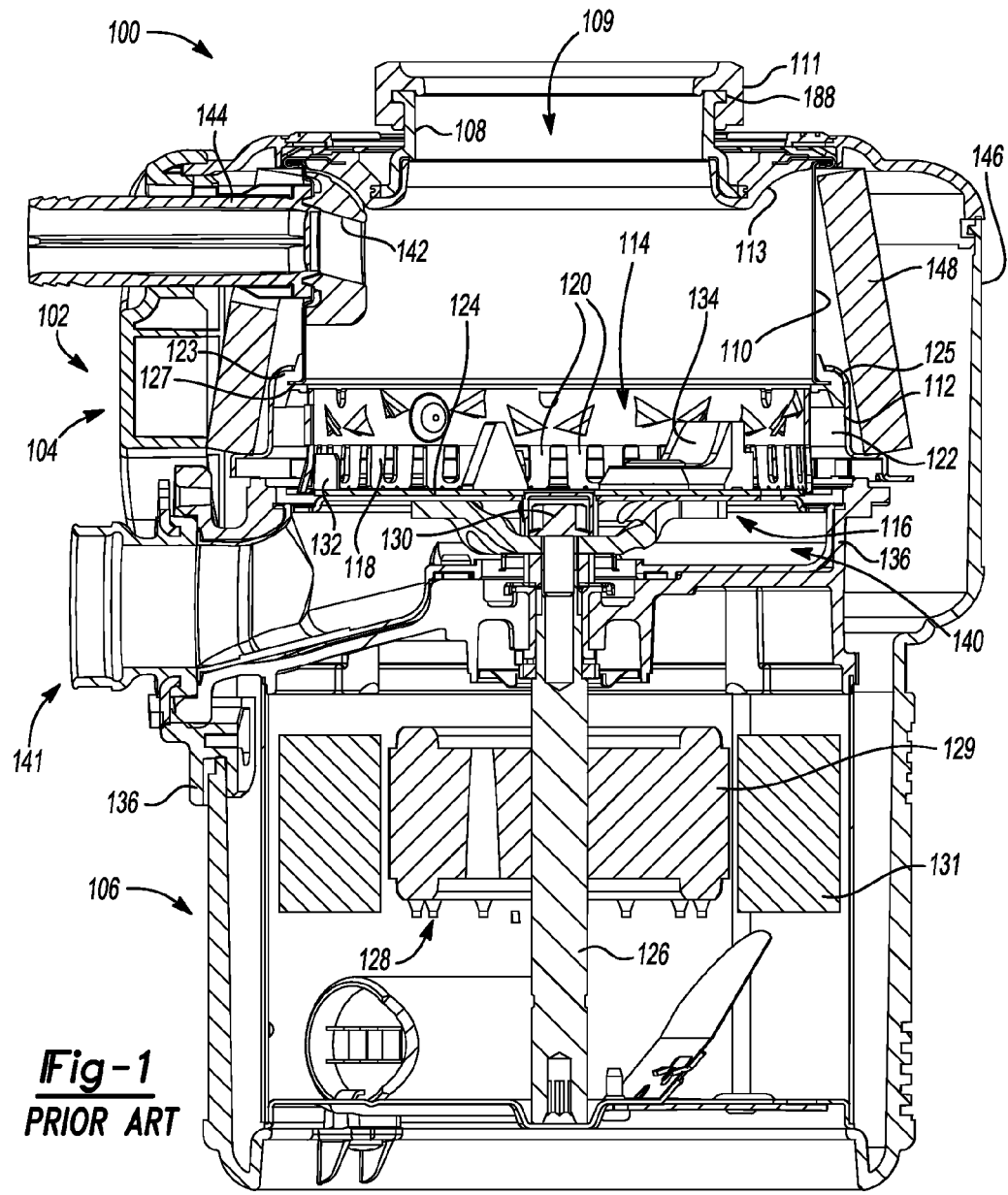
FIG. 1 is a sectional view of a prior art food waste disposer.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. It should be understood that throughout the drawings, corresponding reference numerals indicate like or corresponding parts and features.

Figure 3:
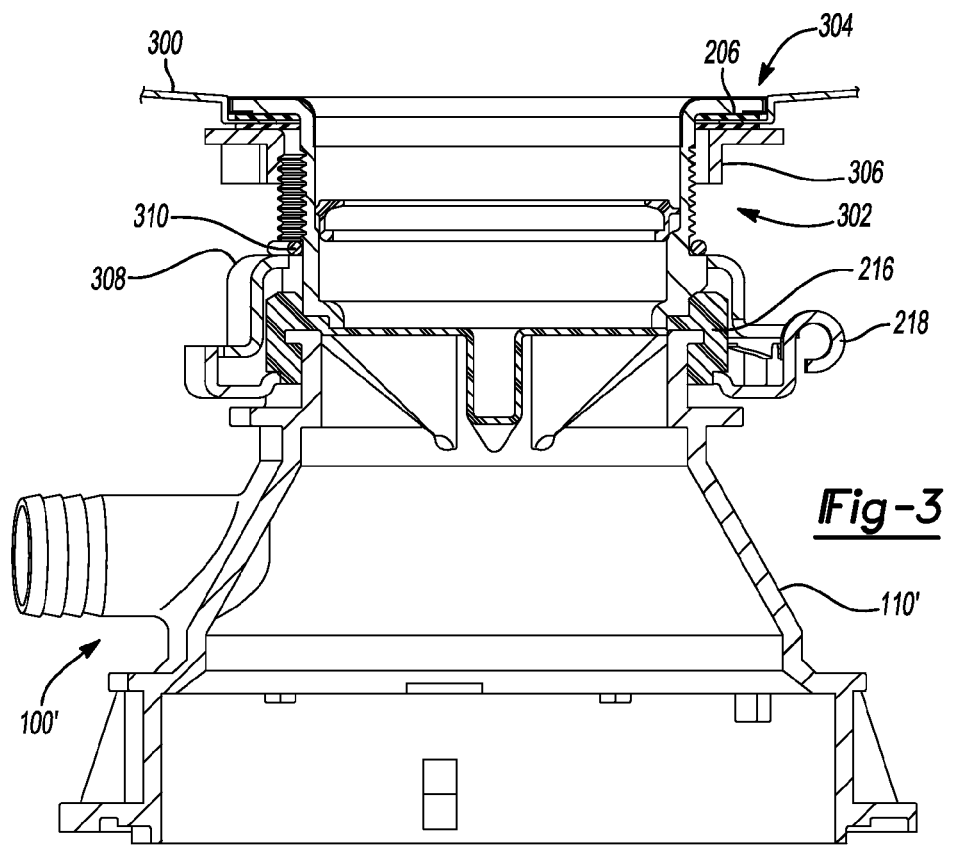
FIG. 3 is a sectional view of a prior art food waste disposer mounted to a sink with a threaded sink flange assembly in accordance with an aspect of the present disclosure.

With reference to FIG. 3, a food waste disposer 100' (only a top portion of which is shown in FIG. 3) having lower mounting flange 218 is mounted to a sink 300 by the engagement of lower mounting flange 218 to a sink flange assembly 302 in accordance with an aspect of the present invention. It should be understood that food waste disposer 100' may have the same basic components as food waste disposer 100 of FIG. 1 described above but with some components having a different configuration. For example, conveying housing 110' may be a frusto-conical shape such as shown in U.S. Pat. No. 6,007,006 rather than cylindrical. A mount other than an anti-vibration mount may be used to attach the inlet housing to the conveying housing. Sink flange assembly 302 mates with lower mounting flange 218 described above and thus can be used with food waste disposers having lower mounting flange 218, as discussed in more detail below.

Figure 4:
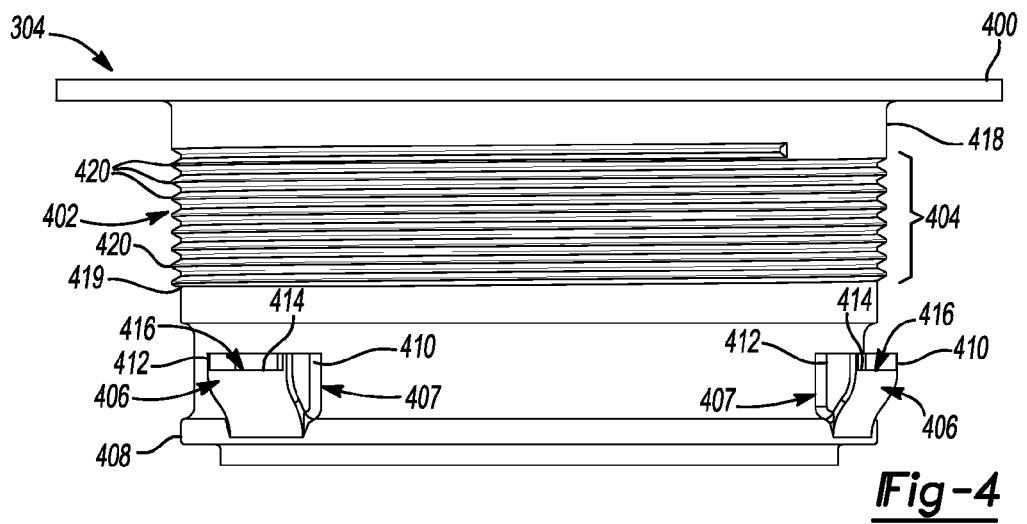
FIG. 4 is a perspective view of a threaded sink flange of the threaded sink flange assembly of FIG. 3.

With reference to FIGS. 3-7, sink flange assembly 302 includes threaded sink flange 304, sink flange nut 306, upper mounting flange 308 and retainer 310. As best shown in FIG. 4, threaded sink flange 304 has a top flange portion 400 that extends radially outwardly from a top of a tubular body portion 402. Tubular body portion 402 extends (as oriented in FIGS. 3 and 4) downwardly from top flange portion 400. Tubular body portion 402 has an externally threaded portion 404. Tubular body portion 402 also has a plurality of mounting ledges 406 projecting radially outwardly therefrom that each extend horizontally (as oriented in FIG. 4) around a portion of an outer circumference of tubular body portion 402. Mounting ledges 406 are adjacent and above a lower end 408 of tubular body portion 402. Illustratively tubular body portion has three mounting ledges 406 located equidistantly around tubular body portion 402, with gaps 407 therebetween. In an aspect, each mounting ledge has a receiving pocket 416 therein. In an aspect, each mounting ledge 406 has opposed upwardly projecting extending ends 410, 412 with a generally flat bottom 414 disposed therebetween that cooperate to form receiving pocket 416. In the example embodiment shown in FIG. 4, tubular body portion 402 may have a smooth portion 418 immediately below top flange portion 400 extending for slightly less or slightly more than a thickness of a sink around a sink opening in which sink flange assembly 302 is received. Externally threaded portion 404 may extend from smooth portion 418 to slightly above mounting ledges 406 so that a bottom 419 of externally threaded portion 404 is slightly above mounting ledges 406. Sink flange assembly 302 may also include sink gasket 206.

Figure 5:
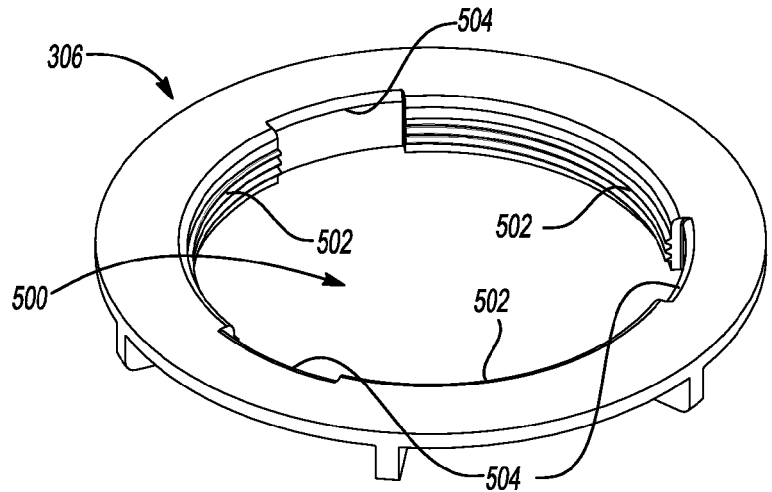
FIG. 5 is a perspective view of a sink flange nut of the threaded sink flange assembly of FIG. 3.

As best shown in FIG. 5, sink flange nut 306 is internally threaded around a central opening 500 with threaded portions 502 interspersed with gaps 504 therebetween. There is illustratively at least a gap 504 corresponding to each mounting ledge 406 with these gaps having a width slightly greater than the width of the corresponding mounting ledges 406 of tubular body portion of threaded sink flange 304. Sink flange nut is threadably engageable with the externally threaded portion of tubular body portion 402 of threaded sink flange 304.

Figure 6:
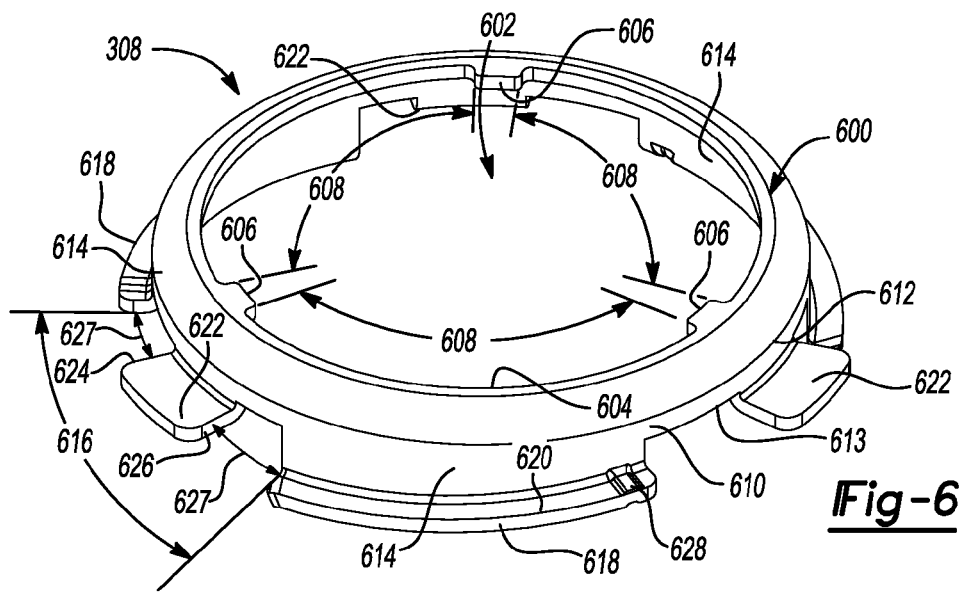
FIG. 6 is a perspective view of an upper mounting flange of the threaded sink flange assembly of FIG. 3.

As best shown in FIG. 6, upper mounting flange 308 has an annular shape with a top ring 600 (as oriented in FIGS. 3 and 6) having a central opening 602 defined by an inner periphery 604 of ring 600. A plurality of mounting projections 606 extend radially inwardly from inner periphery 604 with gaps 608 therebetween. The mounting projections 606 are illustratively arcuate members having an inner diameter that conforms with an outer diameter of tubular body portion 402 of threaded sink flange 304. In the embodiment shown in FIGS. 3, 4 and 6, upper mounting flange 308 has a mounting projection 606 for each mounting ledge 406 of threaded sink flange 304 so that there are the same number of mounting ledges 406 and mounting projections 606. Mounting projections 606 are shaped to be received in receiving pockets 416 of threaded sink flange 304.

Upper mounting flange 308 has an outer wall 610 that extends downwardly from an outer periphery 612 of top ring 600. In an aspect, outer wall 610 is cylindrical. A plurality of flanges 614 extend downwardly from a bottom 613 of outer wall 610. The flanges 614 are spaced circumferentially from each other equidistantly around outer wall 610 with gaps 616 therebetween and include radially outwardly extending inclined mounting ramps 618 that each have an inclined upper surface 620. Mounting ramps 618 are shaped comparably to mounting ramps 222 of upper mounting flange 210 of FIG. 2. Tabs 622 project radially outwardly from bottom 613 of outer wall 610 into gaps 616. Each opposed edge 624, 626 of each tab 622 is spaced from an adjacent mounting ramp 618 so that there is a gap 627 between each tab 622 and the mounting ramps 618 on opposite sides of that tab 622. Each mounting ramp 618 includes a raised projection 628, such as a radial rib, which latches with a corresponding recess feature (not shown) of lower mounting flange 218 when lower mounting flange 218 has been rotated to a latched position to latch lower mounting flange 218 to upper mounting flange 308. Since a typical lower mounting flange 218 has three mounting tabs 220, an embodiment of upper mounting flange 308 has three mounting ramps 618 for compatibility with lower mounting flange 218. Tabs 622 act as stops that are contacted by curved members 224 of lower mounting flange 218 after lower mounting flange 218 is rotated to the latched position to prevent lower mounting flange 218 from being rotated beyond the latched position.

Figure 7:
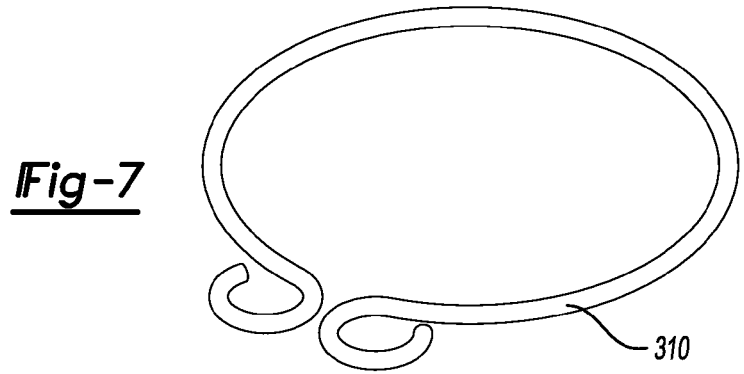
FIG. 7 is a perspective view of a retainer of the threaded sink flange assembly of FIG. 3.

As best shown in FIG. 7, retainer 310 is a snap ring. Retainer 310 may for example be made of plastic or metal.

To install a food waste disposer such as food waste disposer 100' to a sink using sink flange assembly 302, threaded sink flange 304 is placed in a drain opening of a sink with tubular body portion 402 extending downwardly from the drain opening. Top flange portion 400 is received in a recess formed in a top surface of the sink around the drain opening with sink gasket 206 disposed therebetween. Sink flange nut 306 is tightened on externally threaded portion 404 of tubular body portion 402 until sink flange nut 306 is tightened against a bottom surface of the sink. Upper mounting flange 308 is then oriented so that mounting projections 606 are beneath gaps 407 between mounting ledges 406 of tubular body portion 402 of threaded sink flange 304. Upper mounting flange 308 is then lifted up and once mounting projections 606 are above mounting ledges 406, rotated so that mounting projections 606 are directly above receiving pockets 416. Upper mounting flange 308 is then lowered so that mounting projections 606 are received in receiving pockets 416. Retainer 310 is then placed over tubular body portion 402 of threaded sink flange 304 between top ring 600 of upper mounting flange 308 and bottom 419 of externally threaded portion 404 of tubular body portion 402 of threaded sink flange 304. Retainer 310 is thus received around the tubular body portion 402 of the threaded sink flange 304 between the bottom 419 of the externally threaded portion 404 of the tubular body portion 402 and top ring 600 of upper mounting flange 308 when upper mounting flange 308 is assembled to the threaded sink flange 304. At least a portion of threads 420 of externally threaded portion 404 project outwardly so that retainer 310 is captured between the threads 420 at the bottom of externally threaded portion 404 and top ring 600 of upper mounting flange 308, preventing upper mounting flange 308 from moving upwardly. Food waste disposer 100' can then be installed by engaging mounting tabs 220 of the lower mounting flange 218 with the mounting ramps 618 of upper mounting flange 308.

Figure 2:
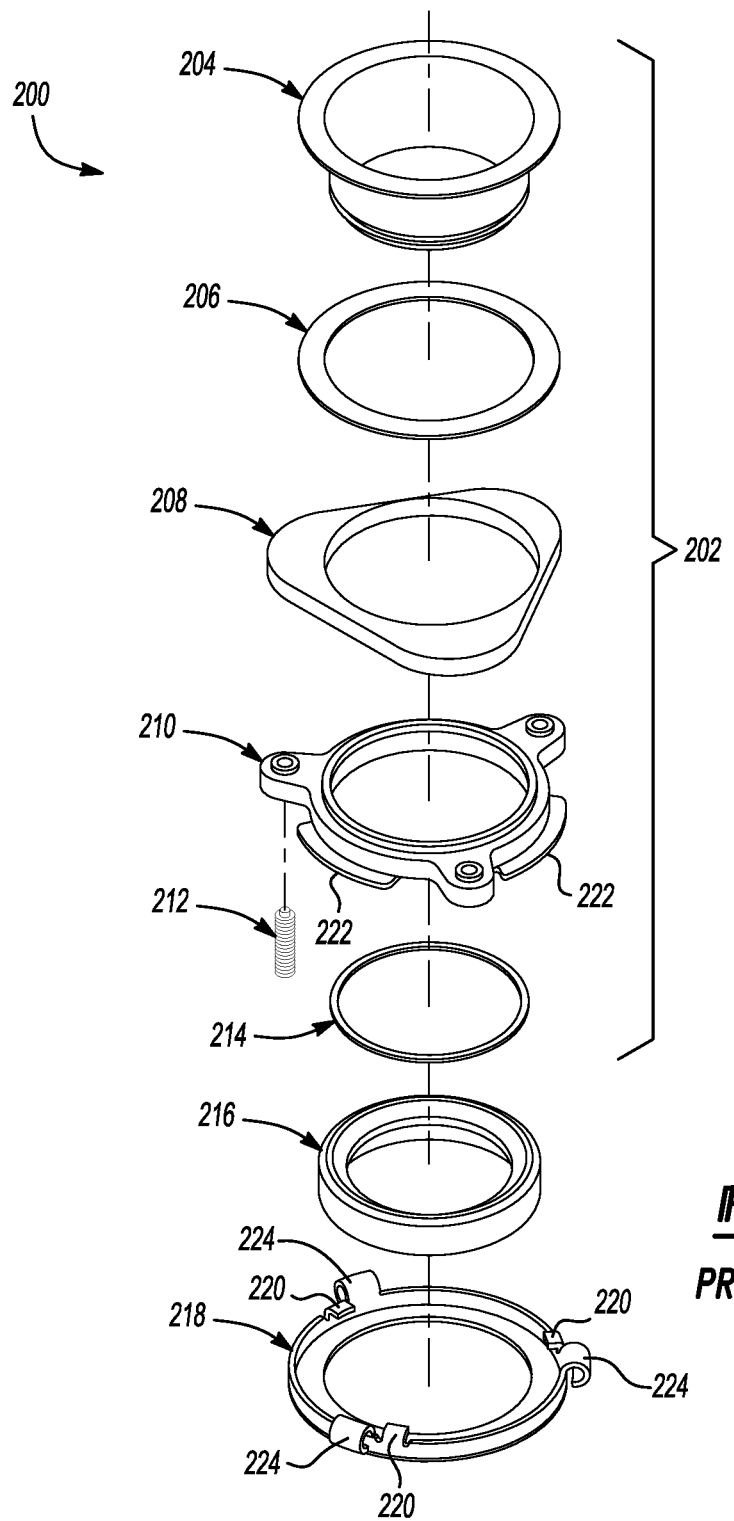
FIG. 2 is an exploded view of a prior art mounting assembly for mounting a food waste disposer to a sink.

As discussed above in the Background section, the sink flange assembly 202 shown in FIG. 2 has multiple parts, illustratively six, needed for its attachment to a sink and its use requires multiple steps to attach it to a sink. In contrast, sink flange assembly 302 in accordance with aspects of the present disclosure has fewer parts and is attached to a sink by use of a simple threaded connection.

Spatially relative terms, such as "inner," "outer," "beneath," "below," "lower," "above," "upper," and the like, may be used herein for ease of description to describe one element or feature's relationship to another element(s) or feature(s) as illustrated in the orientation of the figures, which show the typical orientation of a food waste disposer when mounted to a sink.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention.

What is claimed is:

1. A threaded sink flange assembly for a food waste disposer, comprising: a threaded sink flange, a sink flange nut, an upper mounting flange and a retainer;

the threaded sink flange has a top flange portion that extends radially outwardly from a top of a tubular body portion;

the tubular body portion has an externally threaded portion and a plurality of radially outwardly projecting mounting ledges adjacent and above a lower end of the tubular body portion with gaps therebetween;

the sink flange nut is internally threaded around a central opening with threaded portions interspersed with gaps, there being at least a gap corresponding to each mounting ledge with those gaps being wider than the corresponding mounting ledges;

the upper mounting flange has an annular shape with a top having a central opening defined by an inner periphery of a ring;

a plurality of mounting projections extend radially inwardly from the inner periphery of the ring with gaps therebetween wherein the mounting projections are received on the mounting ledges when the upper mounting flange is assembled to the threaded sink flange;

an outer wall extends downwardly from an outer periphery of the top ring of the upper mounting flange; and a plurality of flanges extend downwardly from a bottom of the outer wall of the upper mounting flange with gaps therebetween so that there is a gap between adjacent flanges and each of these downwardly extending flanges has a radially outwardly extending inclined mounting ramp.

2. The threaded sink flange assembly of claim 1 wherein tabs project outwardly from the bottom of the outer wall of the upper mounting flange into gaps between the flanges so that there is a tab projecting into each gap.

3. The threaded sink flange assembly of claim 1 wherein each mounting ledge has a receiving pocket therein.

4. The threaded sink flange assembly of claim 3 wherein each mounting ledge has opposed upwardly projecting ends with a generally flat bottom therebetween that define the receiving pocket.

5. The threaded sink flange assembly of claim 1 wherein the retainer is a snap ring that is received around the tubular body portion of the threaded sink flange between a bottom of the threaded portion of the tubular body portion and the upper mounting flange when the upper mounting flange is assembled to the threaded sink flange.

6. The threaded sink flange assembly of claim 5 wherein the upper mounting flange has three mounting ramps spaced circumferentially from each other equidistantly around the outer wall of the upper mounting flange.

7. The threaded sink flange assembly of claim 1 wherein the upper mounting flange has three mounting ramps spaced circumferentially from each other equidistantly around the outer wall of the upper mounting flange.

8. The threaded sink flange assembly of claim 7 wherein the retainer is a snap ring that is received around the tubular body portion of the threaded sink flange between a bottom of the threaded portion of the tubular body portion and the upper mounting flange when the upper mounting flange is assembled to the threaded sink flange.

9. The threaded sink flange assembly of claim 8 wherein tabs project outwardly from the bottom of the outer wall of the upper mounting flange into gaps between the flanges so that there is a tab projecting into each gap.

* * * * *